United States Patent [19]
Waters et al.

[11] Patent Number: 5,378,555
[45] Date of Patent: Jan. 3, 1995

[54] ELECTRIC VEHICLE BATTERY PACK

[75] Inventors: John E. Waters, Fishers; Brent A. Harris, Alexandria; Ross A. Gresley; William E. Boys, both of Anderson; Daniel R. Brouns, Indianapolis, all of Ind.

[73] Assignee: General Motors Corporation, Detroit, Mich.

[21] Appl. No.: 172,705

[22] Filed: Dec. 27, 1993

[51] Int. Cl.⁶ .............................................. H01M 2/10
[52] U.S. Cl. ........................................ 429/97; 429/99; 429/123; 180/68.5
[58] Field of Search ............... 429/96, 97, 99, 100, 429/123; 180/68.5; 206/333; 307/150

[56] References Cited
U.S. PATENT DOCUMENTS

| | | | |
|---|---|---|---|
| 3,657,021 | 4/1972 | Mathews | 429/97 |
| 4,109,064 | 8/1978 | Warner et al. | 429/99 X |
| 4,365,681 | 12/1982 | Singh | 180/68.5 |
| 5,061,579 | 10/1991 | Ishimoto | 429/100 X |

Primary Examiner—Anthony Skapars
Attorney, Agent, or Firm—Lawrence B. Plant

[57] ABSTRACT

An electric vehicle battery pack including a plurality of batteries ganged together in an underlying tray. The tray preferably has a plurality of pockets therein each for receiving an individual battery. The batteries are interlocked one to the next and held in place in the tray by a housing which bears down on the batteries by means of a resilient spacer positioned between the tops of the batteries and the ceiling of the housing. The pack forms a structural part of the vehicle in which it is used.

26 Claims, 5 Drawing Sheets

ELECTRIC VEHICLE BATTERY PACK

This invention relates to a battery pack for powering an electric vehicle.

BACKGROUND OF THE INVENTION

Electric vehicles with or without a supplemental IC engine (i.e., hybrid electric vehicle) require onboard batteries to power their electric drive systems. The performance requirements of electric vehicles dictate the need for ganging many batteries together into a variety of configurations depending on the vehicle's design. Batteries so ganged together are known as a battery pack. A battery pack comprises a plurality of individual batteries electrically connected one to the other, is anchored to the vehicle and will typically include a number of accessory electronic components for controlling the charge and discharge performance of the pack. The problems associated with packaging and positioning of a large mass within the vehicle becomes even more complicated when the vehicle design necessitates that the batteries be stacked or tiered on top of each other as is often required to maximize energy storage potential while minimizing space utilization within the vehicle. The battery pack can approach 50 percent of the vehicle's weight especially when the batteries are of the lead-acid variety. In some cases so many batteries are required to satisfy a vehicle's power demands that layers of batteries are tiered one atop the other in a stack and these many batteries must be securely retained in both the horizontal and vertical directions for minimizing dynamic effects on the vehicle. Due to the size and mass of the battery packs, the structural ramifications to the vehicle are considerable and the battery pack's location and configuration has a direct and significant impact on the ride, handling, and performance of the vehicle. The manner in which the batteries are packaged and retained in the vehicle are so crucial to the function of the vehicle that ofttimes the battery pack forms a structural part of the vehicle. The hold-down devices for the batteries must be lightweight yet adequate to minimize any movement of the batteries in the pack. The stacking/tiering of batteries introduces several problems that must be considered in the battery pack hold-down system. The batteries must be firmly held vertically for elimination of bounce and associated noise while at the same time also must be held horizontally to minimize dynamic affects on the vehicle's handling. At the same time, it is necessary to minimize the weight of the hold-down system so that the performance and the range of the vehicle is not unnecessarily compromised. Finally due to the material used to form the battery cases (i.e., typically injection molded polypropylene), batteries have tendencies to creep away from pressure points introduced with the hold-down fastening systems commonly seen today, e.g., for SLI applications resulting in a loosening of the batteries in the pack and consequent movement thereof in the vehicle.

It is a principal object of the present invention to package an electric vehicle battery pack, stacked or unstacked, in such a way that the batteries remain tightly packed and environmentally sealed, the packaging contributes to the structural integrity of the vehicle, and the pack is not a detriment to the vehicle's performance. It is a further object of the present invention to provide a packaging scheme with minimal fasteners and parts which allows considerable design flexibility for a variety of battery pack configurations. These and other objects and advantages of the present invention will become more readily apparent from the description thereof which follows.

BRIEF DESCRIPTION OF THE INVENTION

The present invention broadly contemplates an electric vehicle battery pack comprising a plurality of batteries ganged together and nesting in an underlying supporting tray. The ends of the batteries are securely joined together by an interlock device for further preventing any relative movement between adjacent batteries in the pack. The supporting tray comprises a plurality of intersecting, upstanding walls which stiffen the tray and define a plurality of pockets each receiving one of the batteries. A perimetrical flange extends outboard the upstanding walls for further strengthening of the tray and for mounting of the battery hold-downs. The battery hold-down comprises a housing enclosing the pack which housing comprises a ceiling wall, a plurality of sidewalls depending from the ceiling wall and a peripheral flange extending outboard from the edges of the sidewalls opposite the ceiling wall and overlying the perimetrical flange on the supporting tray. A resilient spacer (e.g., forominous polymer, rubber, spring-biased feet, etc.) is compressed between the ceiling wall and the tops of the batteries. Fasteners secure the perimetrical and peripheral flanges together so as to provide a rigid structure which provides structural strength to the vehicle while substantially immobilizing the batteries therein against movement.

The present invention further contemplates a battery pack of the type described above comprising at least two tiers of batteries wherein the lowest tier nests in the support tray and supports the upper tier, and an interlock means is provided intermediate the tiers. The interlock has recesses therein adapted to receive and nest with the batteries in the upper and lower tiers so as to prevent relative movement between adjacent batteries. In one embodiment, the interlock is itself a tray which nests with the batteries of an upper tier battery and the top of a lower tier and interlock with a next adjacent intermediate tray in the pack. In another embodiment, the interlock will include sockets on the ends of the battery container and a gang plug comprising a rigid body portion having a plurality of tongues depending therefrom and engaging sockets on adjacent batteries.

According to a preferred embodiment, there is provided a battery pack comprising a plurality of individual batteries ganged together side-by-side and end-to-end in an underlying tray which supports the batteries. Most preferably, the pack will include at least two tiers of such batteries. The batteries each comprise a container for housing the electrochemical innards of the battery which, in turn, comprises a case and cover therefor. Means are provided on opposite ends of the container for interlocking each battery to the next adjacent battery in the pack. The interlocking means itself comprises at least one socket in the ends of each container, and an interlock plug overlying a set of sockets on adjacent batteries. The interlock plug comprises a rigid body which has a plurality of tongues depending from the body into the sockets of adjacent batteries and holds the batteries together end-to-end, side-by-side, or both depending on the configuration of the battery pack. The interlock plugs will include at least one passage therethrough, transverse their length, for permitting such pack accessories as coolant tubes, interbattery connectors (e.g., cables) and wiring systems for the pack's electronic controllers and/or monitors, and the like to pass therethrough to the end of the pack for connection to the vehicle's drive and/or control systems. When the pack contains two or more tiers the upper and lower batteries will nest in recesses formed in the interlocks. The underlying supporting tray comprises a plurality of intersecting upstanding walls which stiffen the tray and define a plurality of pockets each receiving one of the batteries. The floor of each pocket includes stiffening ribs which elevate the battery slightly above the floor of the pocket. The tray includes a perimetrical flange extending outboard the upstanding walls, a housing encloses the pack and holds it securely in the tray. The housing includes a ceiling wall, a plurality of sidewalls depending from the ceiling wall and a peripheral flange extending outwardly from the edges of the sidewalls opposite the ceiling wall. The peripheral flange of the housing overlies the perimetrical flange of the tray and is secured thereto by appropriate fastening means (e.g., clips, bolts, etc.). The walls of the housing may include some openings therein for reducing its weight and allowing air circulation so long as the ability of the housing to rigidify the pack and add structural strength to the vehicle is not materially compromised. In order to achieve maximum rigidity with the minimum weight, the tray and housing will preferably comprise glass fiber reinforced polypropylene wherein the tray will preferably include about 30 percent by volume glass and the housing about 10 percent by volume glass.

Spring-like spacer means, preferably in the form of a sheet of resilient material (e.g., rubber, foamed polymers, etc.), is provided between the ceiling wall of the housing and the tops of the batteries which material is compressed when the housing is secured to the tray and acts like a spring to provide a downward force on the batteries. The spacer will most preferably comprise beaded, closed-cell polypropylene foam having a plurality of protuberances thereon engaging the tops of the batteries.

The body of the interlock plug will preferably include upstanding walls which define a recess/nest for receiving and retaining the bottom of a battery in a superjacent tier of batteries. That is to say, when the battery pack includes more than one tier of batteries, the interlocks holding the tops of the batteries in the lower tier together serve to support the batteries in the upper tier and prevent the upper tier batteries from shifting laterally once they are positioned in the recess/nest. The interlock plugs may be used with a single row of batteries aligned end-to-end or with two or more rows of side-by-side batteries in which latter case the interlock not only connects the batteries end-to-end but side-by-side as well. The interlock plug will preferably also include a snap-lock retainer tab which engages a projection on the battery container for securely holding the interlock plug in place atop the batteries.

DETAILED DESCRIPTION OF A PREFERRED EMBODIMENT

The invention will better be understood when considered in the light of the following description of a specific, preferred embodiment thereof which is given hereafter in conjunction with the several Figures in which.

BRIEF DESCRIPTION OF THE DRAWING

FIG. 11 is a bottom view in the direction 11—11 of FIG. 2 showing the inside of the housing; and FIG. 12 is an alternative embodiment of an interlock between upper and lower battery tiers.

FIG. 1 depicts a battery pack for an electric vehicle including an upper tier 2 and a lower tier 4 of individual batteries 6 all nested in a supporting tray 8 and securely held in place thereon by a housing 10 (shown in phantom). An accessory tray 12 may be provided inside the housing 8 for mounting any of a variety of electronic devices for controlling and/or monitoring the pack's charge, discharge, charge balance, performance, and the like. Alternatively, another row of batteries 6 may replace the tray 12. A console 14 may be provided at the end of the pack for mounting additional control/monitoring devices and receiving wiring from within the pack.

FIG. 2 is an exploded view of the pack of FIG. 1. The underlying supporting tray 8 includes a plurality of upstanding walls 16 and partitions 18 which together define a plurality of pockets 20 each receiving one of the batteries 6 in the lower tier 4. The pockets 20 have a floor 22 therein which in turn has ribs 24 extending upwardly therefrom for stiffening the tray 8. A perimetrical flange 26 extends about the perimeter of the support tray 8 and provides means for attaching the housing 10 to the tray 8 while at the same time providing additional strength/stiffness to the tray 8.

Figure 1:
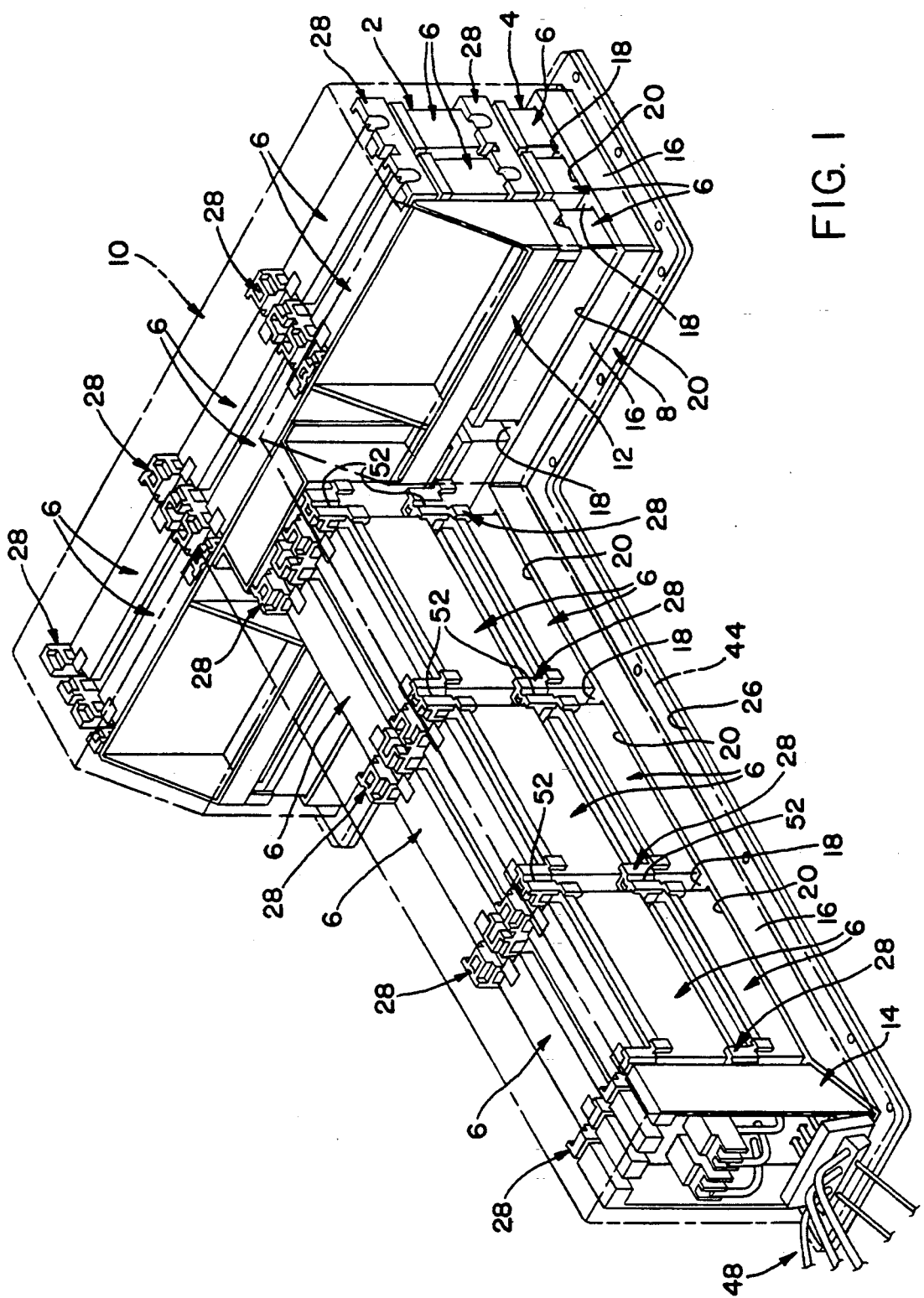
FIG. 1 is an isometric view of a battery pack in accordance with the present invention.

In addition to being nested within the pockets 20 of the tray 8, the several batteries 6 are also interlocked one to the other at the top edges thereof by means of interlocking plugs 28 which are inserted into sockets 30 in the ends of the battery containers as will be discussed in more detail hereinafter. An accessory tray 12 in the upper tier of batteries replaces one of the rows of batteries 6 and will include sockets 32 and tongues 34 comparable to those found in the containers 30 and plugs 28 so that the accessory tray 12 will interlock with the adjacent batteries 6 in the pack in much the same manner as though it were a row of batteries 6.

A layer of resilient material 36 is positioned in the housing 10 so as to press on the tops of the upper tier batteries. The resilient material will preferably comprise closed-cell, beaded polypropylene foam having a density of about 4.3 lbs/cubic foot and is supplied by the Kaneka Texas Corporation under the trade name Eperan-pp. The polypropylene foam 36 will preferably include a plurality of oval protuberances 38 which contact the tops of the batteries 6 in the upper tier 2 and upon compression act like a spring pressing the battery pack firmly into the tray 8 when the housing 10 is secured to the tray 8.

The housing 10 comprises an uppermost ceiling wall 40, depending sidewalls 42 and peripheral flange 44 extending outboard the sidewalls 42 for engaging the perimetrical flange 26 of the support tray 8 and further stiffening the structure. A gasket (not shown) is provided between the flanges for environmentally sealing the housing 10 to the tray 8. An opening 46 is provided in the end of the housing 10 to accommodate wires and cables 48 exiting the pack via the console 14. Vertical ribs 50 are provided on the inside of the sidewalls 42 for engaging recesses 52 in the ends of the plugs 28, and serve not only to guide the housing 10 into place when it is positioned over the batteries but also to further lock the plugs 28 in place and prevent shifting of the batteries within the housing 10.

Figure 6:
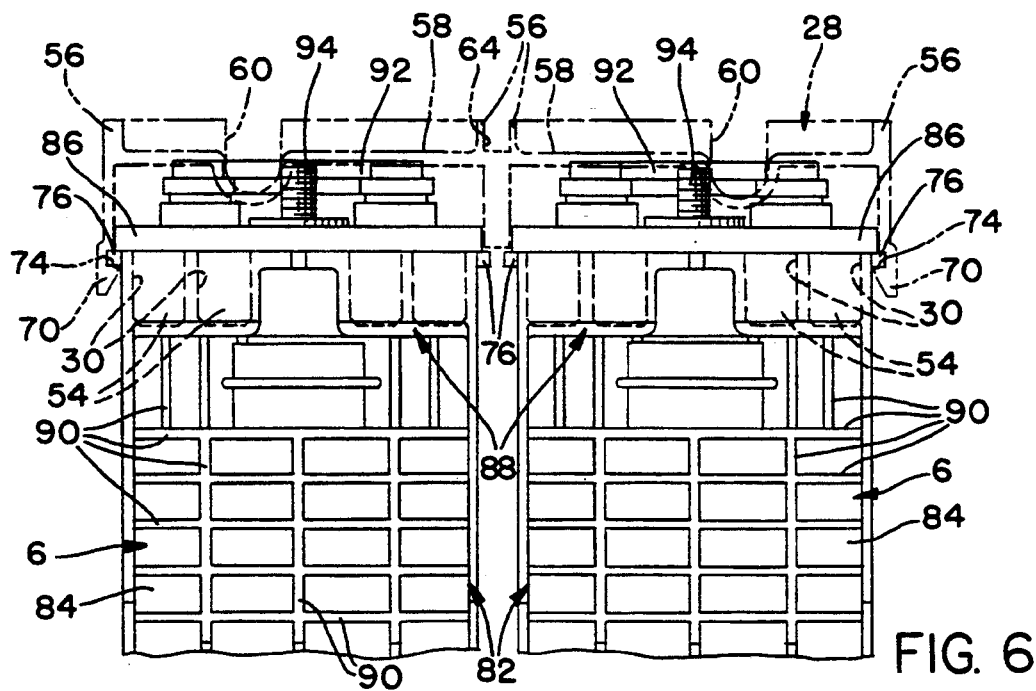
FIG. 6 is an end view of a pair of batteries held together by an interlock (shown in phantom) in accordance with the present invention.
Figure 7:
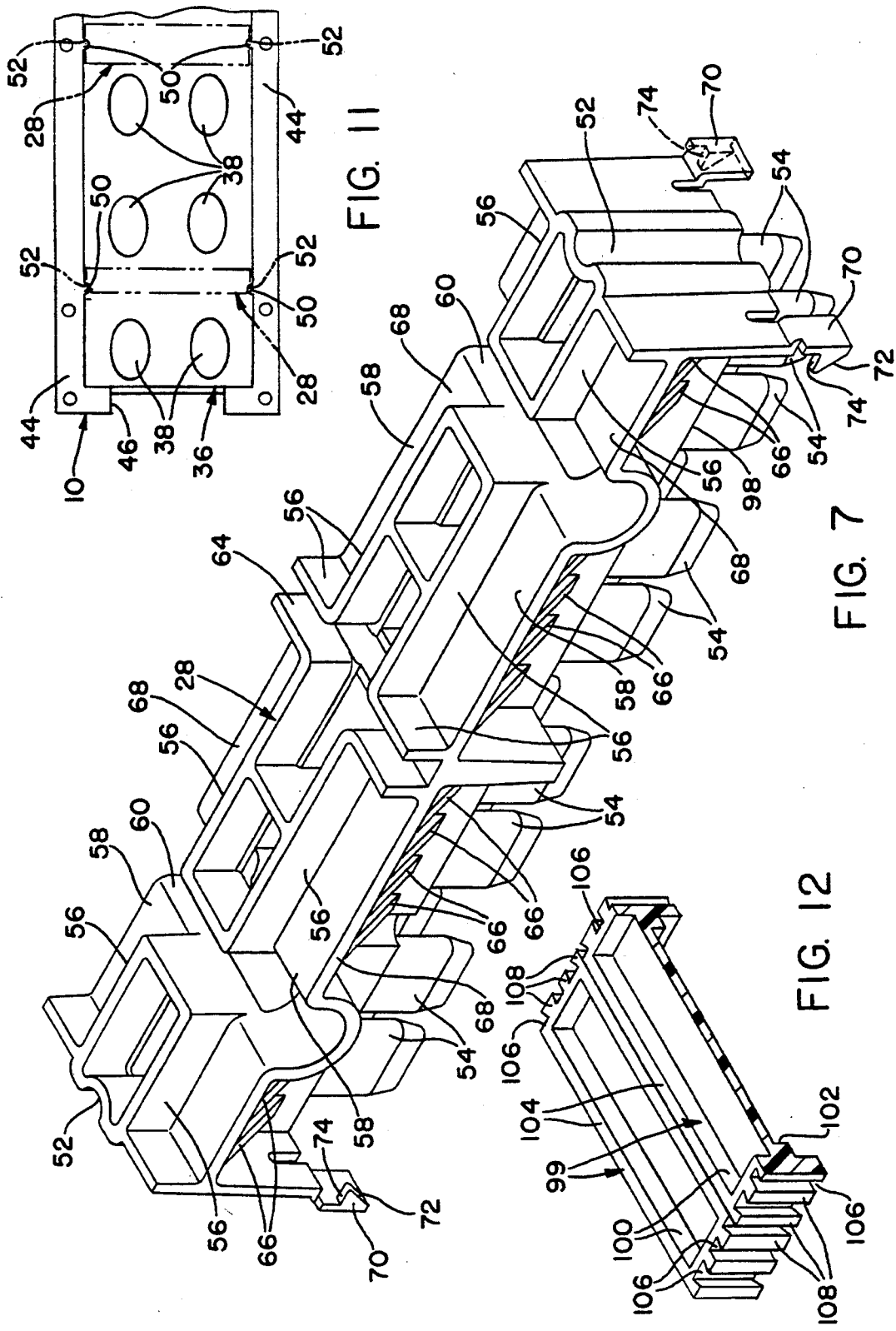
FIG. 7 is an isometric view of an interlock in accordance with the present invention.
Figure 8:
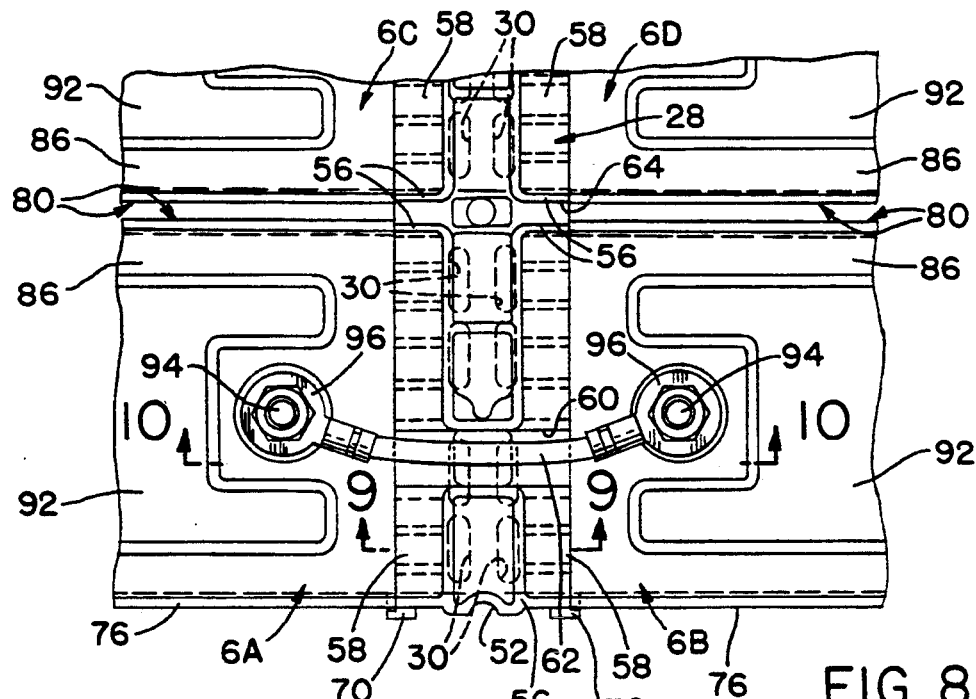
FIG. 8 is a partial plan view of a set of four batteries held end-to-end and side-by-side in accordance with the present invention.

As best shown in FIG. 7, the interlock plug 28 includes a plurality of depending tongues 54. The tongues 54 mate with the sockets 30 in the ends of the batteries 6 shown in FIG. 2. In the particular embodiment shown, the plug 28 serves not only to join the batteries 6 end-to-end, but is also long enough to join batteries side-by-side in the battery pack as illustrated in FIGS. 6 and 8. However, in a situation where only one row of batteries 6 is needed the length of the plug 28 would be shorter and only interlock the batteries end-to-end. Recesses 52 in the ends of the plug 28 are adapted to receive the ribs 50 on the inside of the housing 10 to both guide the housing 10 into position during placement of the housing 10 over the batteries 6 and to prevent any shifting of the batteries in the direction of the long axis of the pack. Upstanding walls 56 define recesses 58 forming a nest for receiving and holding the bottoms of batteries in the next superjacent tier 2 of batteries 6. Channels 60 extend transverse to the plug 28 for passage of a battery cable 62 therethrough for electrically interconnecting adjacent batteries together in the pack. The channels 60, or alternatively one or more other channels 64, may also be used to route other wires or wire bundles (e.g., from the pack's electronic controllers/monitors) throughout the pack. A plurality of gussets 66 support the floor 68 of the recesses 58. Snap-lock tabs 70 are provided at the ends of the plugs 28 and include a camming surface 72 and shoulder 74. When the plug 28 is positioned over a set of sockets to be interlocked together the camming surface 72 engages projections 76 (e.g., elongated rails) formed on the sides of the battery container 80 and cause the snap-lock tab 70 to flex outwardly and then snap back to engage the shoulder 74 under the locking projection 76 and thereby permanently retain the plug 28 in position until such time as the snap-lock tabs 70 are positively disengaged.

Figure 3:
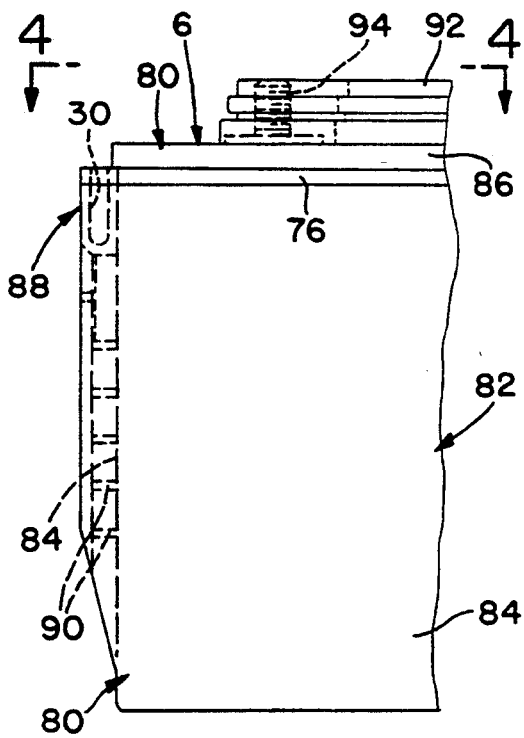
FIG. 3 is a side elevational view of one end of a battery forming part of the battery pack of the present invention.
Figure 4:
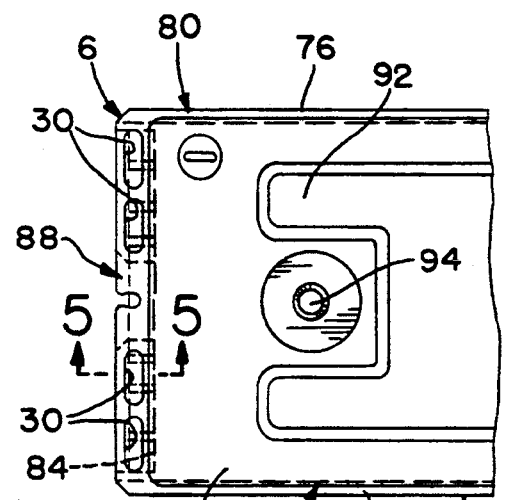
FIG. 4 is a view in the direction 4—4 of FIG. 3.
Figure 5:
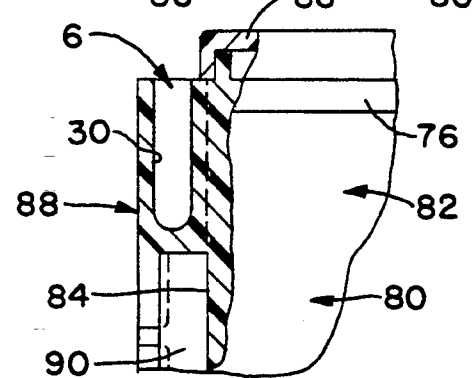
FIG. 5 is a view in the direction 5—5 FIG. 4.

FIGS. 3–5 show a preferred embodiment of a battery container 80 comprising a case 82 having an outer wall 84 and a cover 86. A shelf 88 extends outboard the wall 84 and has the socket 30 of the interlocking means formed therein. Exterior ribbing 90 depend from the shelf 88 and project outwardly from the wall 84 to reinforce the wall 84 and prevent bulging of the case 82 incident to the internal pressures that can build up therein in many battery systems, e.g., valve-regulated, gas recombinant-type lead-acid batteries. A secondary cover 92 is provided and interacts with the primary cover 86 to define a venting manifold for receiving and venting any gases that might otherwise escape from the battery as is common with any modern battery designs. A terminal 94 is provided at each end of the battery 6 for electrically coupling to similar terminals on adjacent batteries via interbattery connector cables 62 (see FIG. 10).

FIGS. 6–10 show various views of the batteries 6 connected side-by-side (i.e., FIG. 6) and end-to-end (i.e., FIG. 8). More specifically, FIG. 6 shows in phantom the interlock plug 28 locked in position between adjacent side-by-side batteries 6 and with the snap-lock tabs 70 engaging projections 76 that extend the length of the battery on both sides thereof.

FIG. 8 is a plan view of four batteries 6 coupled together end-to-end (i.e. , 6(A)–6(B) and 6(C)–6(D) respectively) and side-by-side (i.e. , 6(A)–6(C) and 6(B)–6(D)) by means of plug 28 inserted into the several sockets 30. A cable 62 having appropriate terminal connectors 96 thereon engage the terminals 94 of the end-to-end batteries 6 and pass through the channel 60 in the plug 28.

Figure 9:
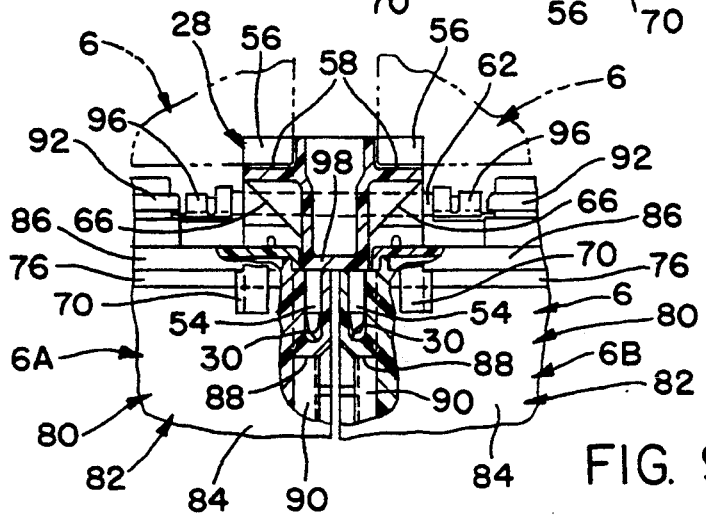
FIG. 9 is a view in the direction 9—9 of FIG. 8.
Figure 10:
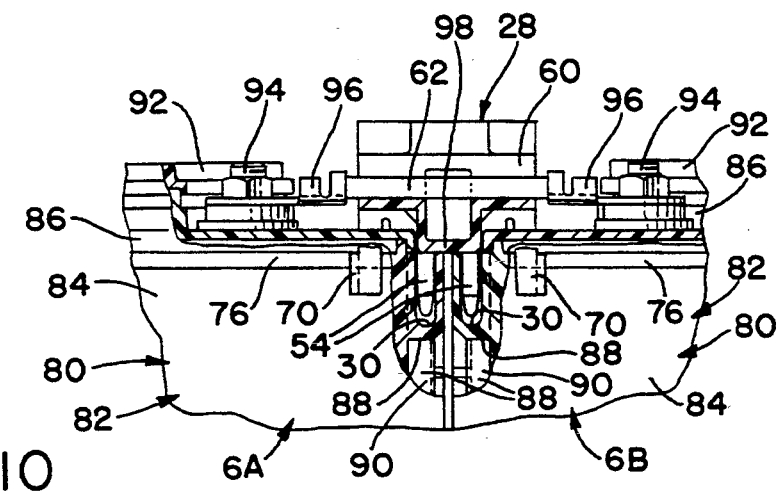
FIG. 10 is a view in the direction 10—10 of FIG. 8.

FIG. 9 depicts the plug 28 with its tongues 54 inserted into the several sockets 30 with the bottom wall 98 of the plug 28 resting squarely atop the upper surface of the shelf 88 which provides an excellent bearing surface over which to distribute the weight of any overhead batteries 6 (shown in phantom nesting in the recess 58). FIG. 10 is a view similar to FIG. 9 but taken through the length of the channel 60 showing the interbattery connecting cable 62.

Figure 2:
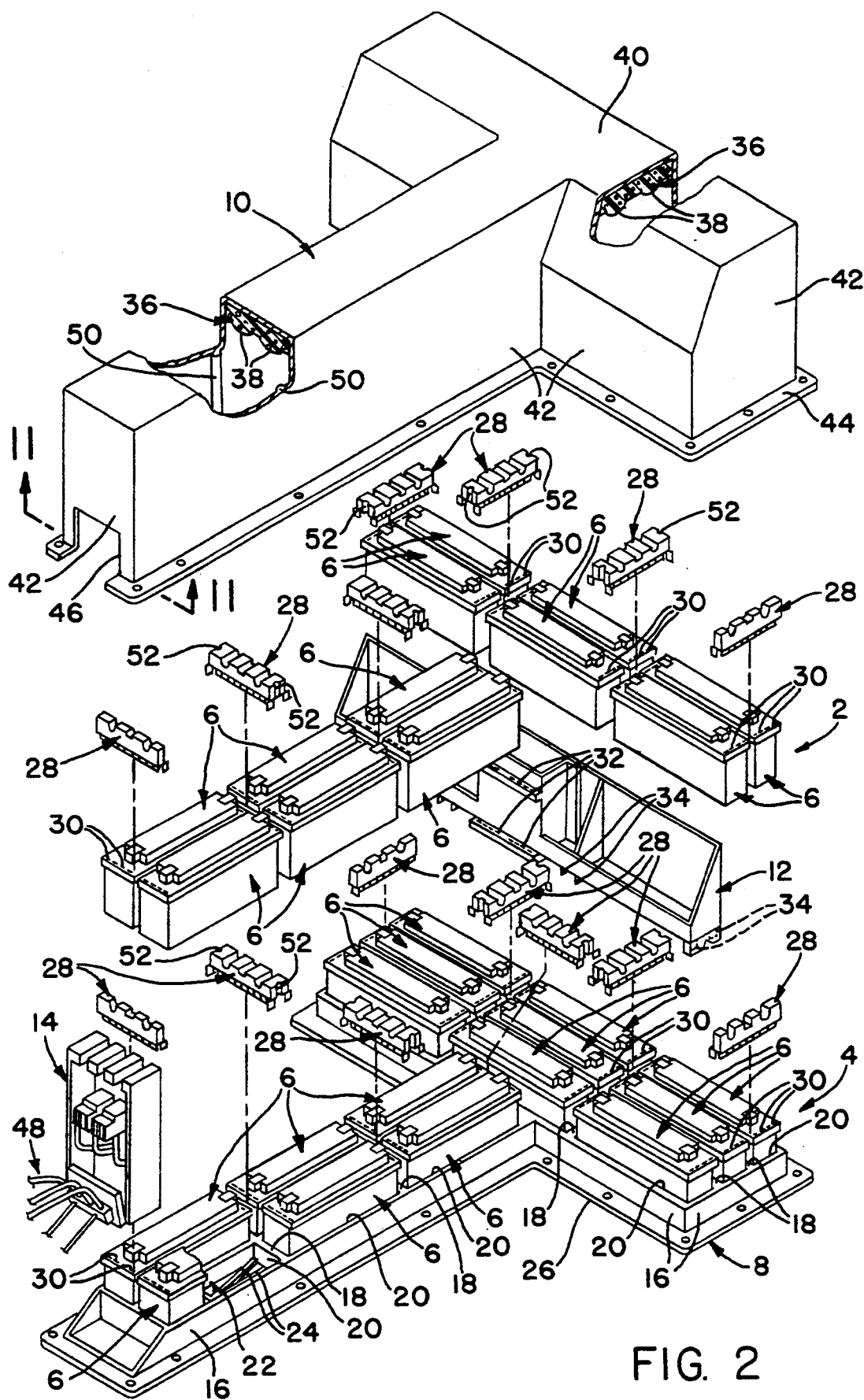
FIG. 2 is an exploded, isometric view of the battery pack in accordance with the present invention.

FIG. 11 is a view taken in the direction 11—11 of FIG. 2 showing the inside of the housing 10. The view shows the underside of the peripheral flange 44, the resilient material 36, protuberances 38 on the material 36, and vertical ribs 50 on the walls 42. Also shown in phantom are plugs 28 with their end recesses 52 engaging the vertical ribs 50 on the inside of the housing 10 as described above.

FIG. 12 depicts another embodiment of a means for interlocking the several batteries one to the other end-to-end and top-to-bottom. More specifically FIG. 12 shows a tray 99 which is adapted to fit between tiers of a multi-tiered pack. The tray 99 has a recess 100 formed in the upper face thereof for receiving the bottom of a battery in an upper tier, and a second recess 102 formed in the lower face for receiving the top of a battery in a lower tier. Both recesses 100, 102 are circumscribed by a frame 104, the ends of which have a series of dovetail mortises 106 and tenons 108 thereon and adapted to mate with a similar tray positioned between upper and lower batteries 6 in the next adjacent set of batteries.

While the invention has been described primarily in terms of specific embodiments thereof it is not intended to be limited thereto but rather only to the extent set forth hereafter in the claims which follow.

The embodiments of the invention in which an exclusive property or privilege is claimed as defined as follows:

1. A battery pack for an electric vehicle comprising a plurality of individual batteries ganged together and nesting in an underlying supporting tray, and interlock means engaging the ends of said batteries for preventing relative movement between adjacent batteries in the pack, said supporting tray comprising a plurality of intersecting, upstanding walls stiffening said tray and defining a plurality of pockets each receiving a one of said batteries, a perimetrical flange extending outboard said upstanding walls, a housing enclosing said pack, said housing comprising a ceiling wall, a plurality of side walls depending from said ceiling wall, and a peripheral flange extending outwardly from the edges of said sidewalls opposite said ceiling wall and overlying said perimetrical flange, a resilient spacer compressed between said ceiling wall and the tops of the batteries, and fastener means joining said perimetrical and peripheral flanges securely together so as to provide a rigid structure which provides structural strength to said vehicle while substantially immobilizing the batteries against movement.

2. A battery pack for an electric vehicle comprising a plurality of individual batteries ganged together, an underlying supporting tray, a lower tier of said batteries nesting in said supporting tray, an upper tier of said batteries overlying and supported by said lower tier and interlock means intermediate said tiers, said interlock means having recesses therein nesting with said batteries in said upper and lower tiers and preventing relative movement between adjacent batteries in the pack, said supporting tray comprising a plurality of intersecting, upstanding walls stiffening said tray and defining a plurality of pockets each receiving a one of said lower tier batteries, a perimetrical flange extending outboard said upstanding walls, a housing enclosing said pack, said housing comprising a ceiling wall, a plurality of sidewalls depending from said ceiling wall, and a peripheral flange extending outwardly from the edges of said sidewalls opposite said ceiling all and overlying said perimetrical flange, a resilient spacer compressed between said ceiling wall and said upper tier of batteries, and fastener means joining said perimetrical and peripheral flanges securely together so as to provide a rigid structure which provides structural strength to said vehicle while substantially immobilizing the batteries against movement.

3. A battery pack according to claim 2 wherein said interlock comprises a tray having a first recess in an upper face for receiving the underside of a battery in said upper tier, a second recess in a lower face for receiving the topside of a battery in said lower tier and coupling means on the perimeter of said interlock tray for coupling said tray to a next adjacent interlock tray in said pack.

4. A battery pack according to claim 3 wherein said coupling means comprises mortise and tenon means mating with complementary mortise and tenon means on the next adjacent interlock tray.

5. A battery pack according to claim 4 wherein the mating mortise and tenon means form a dovetail joint.

6. A battery pack according to claim 2 said interlock comprises at least one socket formed in the ends of each battery and a plug overlying a set of sockets on adjacent batteries said plug comprising a rigid body and a plurality of tongues depending from said body into the sockets of said set.

7. A battery pack comprising a plurality of individual batteries ganged together side-by-side and end-to-end in an underlying tray supporting said batteries, said batteries each comprising a container, means on opposite end of said container for locking each container to the next adjacent battery in the pack, said locking means comprising a socket in each said container and an interlock member overlying a set of sockets on adjacent batteries said interlock member comprising a rigid body and a plurality of tongues depending from said body into the sockets of said set to hold said adjacent batteries together, and anchoring means for holding said batteries securely in said tray.

8. A battery pack according to claim 7 wherein said anchoring means engages said interlocking means.

9. A battery pack according to claim 8 wherein said anchoring means engages said tray.

10. A battery pack according to claim 7 wherein said tray comprises a plurality of intersecting, upstanding walls stiffening said tray and defining a plurality of pockets each receiving a one of said batteries.

11. A battery pack according to claim 10 wherein each said pocket is defined by a floor having reinforcing ribs upstanding therefrom and supporting the battery therein.

12. A battery pack according to claim 11 wherein said reinforcing ribs extend diagonally across said floor and intersect in the middle thereof.

13. A battery pack according to claim 7 wherein said tray includes a perimetrical flange extending outboard said upstanding walls and said anchoring means comprises a housing enclosing said pack, said housing comprising a ceiling wall, a plurality of sidewalls depending from said ceiling wall, and a peripheral flange extending outwardly from the edges of said sidewalls opposite said ceiling wall and overlying said perimetrical flange, and fastener means joining said perimetrical and peripheral flanges securely together.

14. A battery pack according to claim 7 wherein said anchoring means comprises a housing enclosing said pack and secured to said tray, said housing comprising a ceiling wall overlying said pack and a plurality of sidewalls depending from said ceiling wall circumscribing said pack.

15. A battery pack according to claim 14 wherein said anchoring means includes a resilient spacer compressed between said ceiling wall and the tops of said batteries.

16. A battery pack according to claim 15 wherein said spacer comprises a foamed polymer.

17. A battery pack according to claim 7 wherein said body includes at least one passage therethrough transverse its length for receiving interbattery electrical connectors, pack control wiring, pack coolant conduits and the like.

18. A battery pack according to claim 7 wherein said pack includes a plurality of tiers of batteries ganged together and said body includes upstanding walls defining a nest receiving a battery in a superjacent tier.

19. A battery pack according to claim 7 wherein a single said interlocking member engages adjacent batteries which are end-to-end and side-by-side.

20. A battery pack according to claim 7 wherein each said container includes a lateral projection extending outwardly from an external wall thereof and said interlocking member includes a retainer having a shoulder thereon for engaging said projection and securely fastening said member to said batteries.

21. A battery pack according to claim 7 wherein the underside of said body engages said container atop said sockets.

22. A battery pack according to claim 20 wherein said projection comprises a rib extending the length of said container.

23. A battery pack according to claim 14 wherein said tray and said housing comprise a glass reinforced polymer.

24. A battery pack according to claim 23 wherein said polymer comprises polypropylene.

25. A battery pack comprising a plurality of individual batteries ganged together side-by-side and end-to-end in an underlying tray supporting said batteries, said batteries each comprising a container having a case and cover, a shelf on said case overhanging each end of said battery and confronting a shelf on a next adjacent battery in the pack, a socket in each said shelf, an interlock comprising a rigid body overlying a set of adjacent shelves and a plurality of tongues depending from said body into said sockets for holding said adjacent batteries together, and anchoring means engaging said tray and holding said batteries securely in said tray.

26. A battery according to claim 10 wherein said foamed polymer comprises beaded polypropylene.

* * * * *